United States Patent [19]

Lindsay

[11] Patent Number: 5,409,976
[45] Date of Patent: Apr. 25, 1995

[54] SIMPLE TWO-COMPONENT ZERO-HALOGEN FLAME RETARDANT

[75] Inventor: Alan Lindsay, Ware, England

[73] Assignee: Minnesota Mining and Manufacturing Company, St. Paul, Minn.

[21] Appl. No.: 39,400

[22] Filed: Apr. 21, 1993

[30] Foreign Application Priority Data

Apr. 24, 1992 [GB] United Kingdom ............... 9208926

[51] Int. Cl.⁶ ............................................. C08K 5/5399
[52] U.S. Cl. ........................................ 524/100; 524/80; 524/121
[58] Field of Search .................... 544/232; 528/399; 540/542; 524/100, 121, 416, 80

[56] References Cited

U.S. PATENT DOCUMENTS

| | | | |
|---|---|---|---|
| 3,244,647 | 4/1966 | Greenley et al. | 528/399 |
| 3,485,793 | 12/1969 | Busse et al. | 260/45.75 |
| 3,541,046 | 11/1970 | Kerst | 260/45.8 |
| 3,810,862 | 5/1974 | Mathis et al. | 260/42.45 |
| 4,001,177 | 1/1977 | Tsutsumi et al. | 260/45.8 |
| 4,012,343 | 3/1977 | Raley | 524/80 |
| 4,062,909 | 12/1977 | Morgan | 524/100 |
| 4,140,660 | 2/1979 | Den Otter et al. | 162/159 |
| 4,175,180 | 11/1979 | Hermans | 528/399 |
| 4,182,792 | 1/1980 | Hermans | 528/332 |
| 4,198,493 | 4/1980 | Marclandi | 525/164 |
| 4,208,317 | 6/1980 | Cerny et al. | 524/80 |
| 4,244,858 | 1/1981 | Tacke et al. | 524/416 |
| 4,341,694 | 7/1982 | Halpern | 252/606 |
| 4,433,115 | 2/1984 | Varma et al. | 525/417 |
| 4,442,255 | 4/1984 | Marciandi et al. | 524/80 |
| 4,461,862 | 7/1984 | Eigenmann | 524/101 |
| 4,491,644 | 1/1985 | Halpern et al. | 524/100 |
| 4,504,610 | 3/1985 | Fontanelli et al. | 524/96 |
| 4,587,362 | 5/1986 | Honig et al. | 564/13 |
| 4,642,366 | 2/1987 | Honig et al. | 558/138 |
| 4,727,102 | 2/1988 | Scarso | 524/100 |
| 4,728,574 | 3/1988 | Alsobury | 428/379 |
| 4,742,088 | 5/1988 | Kim | 521/118 |
| 4,918,127 | 4/1980 | Adur | 524/415 |
| 4,997,876 | 3/1991 | Scarso | 524/451 |

FOREIGN PATENT DOCUMENTS

| | | | |
|---|---|---|---|
| 77342/87 | 8/1987 | Australia | C08K 13/02 |
| 0026391 | 6/1982 | European Pat. Off. . | |
| 0045835 | 7/1984 | European Pat. Off. . | |
| 0115871 | 3/1985 | European Pat. Off. . | |
| 0204027 | 2/1988 | European Pat. Off. . | |
| 0413613A1 | 2/1991 | European Pat. Off. | C08K 5/5397 |
| 51-54640 | 5/1973 | Japan . | |
| 53-49118 | 5/1978 | Japan | D01F 2/02 |
| 1082638 | 9/1967 | United Kingdom | C08K 1/60 |
| 2142638 | 1/1985 | United Kingdom | C08K 3/24 |
| 2181141 | 3/1988 | United Kingdom . | |
| WO85/05626 | 12/1985 | WIPO . | |
| WO89/01011 | 5/1991 | WIPO . | |

OTHER PUBLICATIONS

Derwent Publications Ltd., London, GB; AN 78-428-93A.

Reghunadham Nair & Clouet, "Functionalization of vinyl polymers through polymeric iniferters: synthesis of poly(methyl methacrylate-b-phosphonamide) and poly(styrene-b-phosphonamide)", Polymer, vol. 29, Oct. 1988, pp. 1909–1916.

Chemical Abstract 96:143939f 1982, p. 51.

Primary Examiner—Veronica P. Hoke
Attorney, Agent, or Firm—Gary L. Griswold; Walter N. Kirn; Carolyn V. Peters

[57] ABSTRACT

A flame-retardant additive is provided comprising a source of phosphorus and a polymer or oligomer which is a phosphorus/nitrogen-containing oligomer or polymer. These additives are found to be particularly suitable for use in polymer materials when used in combination with a second and different source of phosphorus, resulting in an additive having reduced smoke generation, reduced evolution of corrosive gases and improved flame-retarding properties.

27 Claims, No Drawings

SIMPLE TWO-COMPONENT ZERO-HALOGEN FLAME RETARDANT

TECHNICAL FIELD

This invention relates to flame-retardants, and in particular to non-halogen-containing compounds suitable for use in flame-retardant additives for polyolefins and other types of polymer materials.

BACKGROUND OF THE INVENTION

Electrical fires in machinery frequently arise as a result of an electrical fault causing ignition and combustion of polymer materials, such as the insulating cladding of wires and cables. Such fires are a serious problem presenting a potential hazard to both workers and property, not only from the fire, but also from the evolution of toxic gases derived from the thermal degradation of the polymer materials. The problem may be compounded when access to the point of ignition is physically restricted, e.g., within machines,, circuitry etc., thereby limiting manual attempts to extinguish or even recognize the fire. Accordingly, there has been much interest in the development of polymer compositions having improved resistance to combustion.

It is known that blending certain compounds into a prepolymer composition can have a flame-retarding effect on the combustion of the final product. Halogen-containing flame-retardant additives are known and have been used to reduce the flammability of polymer materials. However, there is an increasing awareness of the problems associated with the use of halogenated flame-retardants. For example, halogenated flame-retardants are known to cause both high smoke generation and the emission of toxic gases which present a hazard to both workers and fire fighters alike, as well as corrosive gases which may damage adjacent circuitry. In addition, these gases may also have wider reaching deleterious environmental effects. Alternatives to halogenated flame-retardants can be broadly classed into either (a) phosphorus-based materials or (b) non-phosphorus-based materials.

Most non-phosphorus-based materials comprise inert filler materials, such as calcium carbonate, which have little anticombustion effect. Alumina trihydrate, magnesium hydroxide and calcium carbonate have been used as flame-retardant additives for polyolefin polymers. Unfortunately, such materials require high loading by weight of the polymer composition to achieve the desired level of flammability performance. This high loading is found to have a pronounced negative effect on the physical properties of the polymer, e.g., tensile strength and/or elongation. Additionally, materials such as alumina trihydrate have poor thermal stability.

The use of phosphorus-based flame-retardants is known, particularly the use of inorganic phosphates to generate intumescent formulations which form a protective foamed char when exposed to heat, thereby preventing further combustion. Such formulations have generally found applications in cellulosic type materials, resins and formulations containing low molecular weight polyols for paints, and other such coating materials. Various combinations of phosphorus-containing compounds are disclosed in, for example: Chemical Abstracts 92 111554 and 96 143939; U.S. Pat. Nos. 3485793,, 3541046, 3810862, 4001177, 4140660, 4182792, 4198493, 4341694, 4433115, 4491644, 4587362, 4642366 and 4742088; International Patent Nos. W085/05626 and W089/01011; British Patent Nos. 2142638 and 2181141; Australian Patent Application No. 77342/87, and European Patent Nos. 0026391, 0045835, 0115871, 0204027 and 0413613. However, these prior art flame-retardants are found to suffer from one or more of the following disadvantages:

(i) Water sensitivity.

(ii) Migration of the additive due to non-compatibility between the component compounds and the polymer matrix.

(iii) The deleterious action of the additive on the physical properties of the polymer.

(iv) The high specificity of the additive, for example, U.S. Pat. No. 4491644 discloses a flame-retardant additive comprising a salt formed from melamine and bis(-pentaerythritol phosphate) phosphoric acid formulated for use principally in poly(propylene). Such materials are commercially available under the trade name CHARGARD. Likewise, European Patent No. 0115871 discloses flame-retardant additives comprising a nitrogen-containing oligomer and ammonium polyphosphate, which are Commercially available under the trade name SPINFLAM in grades specific to a particular polymer, e.g., polyethylene. As such, there is a continuing need for a high performance method of flame-retardation for use in polymers.

SUMMARY OF THE INVENTION

Alternative compounds have now been found which are suitable for use in flame-retardant additives for polymer materials having reduced smoke generation, reduced evolution of corrosive gas and improved flammability properties. The compounds are compatible with a variety of polymers applicable for wire and cable insulation, heat recoverable materials and mouldable parts. Furthermore, they exert a surprisingly low opacifying effect on polymers in which they are dispersed, and hence are suitable for use in translucent films.

Some of these compounds have been prepared previously as intermediates in the synthesis of more complex polymers with the stated aim of improving the inherent flammability resistance of the polymers. A paper by Reghunadhan Nair, C. P. and Clouet, G. entitled "Functionalization of vinyl polymers through polymeric initiators: synthesis of poly(methylmethacrylate-b-phosphonamide) and poly(styrene-b-phosphonamide)" and published in *Polymer*, Vol.29, pp. 1909 to 1917 (1988), discloses the preparation of thermal polymeric iniferters based on poly(thiuram disulphides) bearing polyphosphonamide blocks. Subsequent thermal polymerization of methylmethacrylate and styrene in the presence of these iniferters is used to produce block copolymers of poly(methylmethacrylate-b-phosphonamide) and poly(styrene-b-phosphonamide).

The use of these compounds as flame-retardant additives with a secondary source of phosphorus for compounding with existing polymers has not previously been described. Japanese Patent Application No. 53-049118 discloses the combination of a phosphonamide polymer and a second phosphorus-containing polymer as a flame retardant additive for cellulosic fibers. The second phosphorus-containing polymer is halogen-substituted.

DESCRIPTION OF THE PREFERRED EMBODIMENT(S)

According to the present invention, there is provided a flame-retardant additive comprising a source of phosphorus and a polymer or oligomer having repeating units selected from those represented by general formulae (I) and (II)

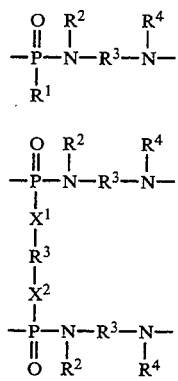

in which;

$R^1$ represents an alkyl group comprising up to 20 carbon atoms, an aryl group comprising up to 10 carbon ring atoms or a group represented by —$YR^5$ where $R^5$ is an alkyl or other aliphatic group comprising up to 20 carbon atoms or an aryl group comprising up to 10 carbon ring atoms and Y is O, S or —$NR^6$ where $R^6$ is a hydrogen atom, an alkyl group comprising up to 20 carbon atoms, an aryl group comprising up to 10 carbon ring atoms or $R^5$ and $R^6$ may together form a heterocyclic ring (including the N atom) wherein the other ring atoms are chosen from C, N, O and S;

each $R^3$ independently represents a divalent aliphatic linking group comprising up to 20 carbon atoms or a divalent aromatic linking group comprising up to 10 carbon ring atoms;

$R^2$ and $R^4$ independently represent a hydrogen atom, an alkyl group comprising up to 20 carbon atoms, an aromatic group comprising up to 10 carbon ring atoms or, when $R^3$ is aliphatic, $R^2$ and $R^4$ may complete a heterocyclic ring including —N—$R^3$—N—, the remaining ring atoms being selected from C, N, O and S, and $X^1$ represents O, S or $NR^2$ where $R^2$ is as defined previously, and $X^2$ represents O, S or $NR^4$ where $R^4$ is as defined previously.

Compounds having repeating units of formulae (I) and (II) are phosphorus/nitrogen-containing oligomers and polymers (referred to hereinafter as "P/N compounds"). These compounds are found to be particularly suitable for use as flame-retardant additives in polymer materials when used in combination with a second and different source of phosphorus, resulting in an additive having reduced smoke generation, reduced evolution of corrosive gases and improved flame-retarding properties. The combination of the P/N compound and the second source of phosphorus is found to have a synergistic or super-additive effect on the level of flame-retardancy achieved for a given polymer system when compared with that obtained for each of the components used alone. The flame-retardant additives of the invention are compatible with a variety of polymers-applicable for wire and cable insulation, heat recoverable items, translucent films and moulded parts.

$R^1$ represents an alkyl group comprising up to 20 carbon atoms, preferably up to 10 carbon atoms and more preferably up to 5 carbon atoms, or an aryl group comprising up to 10 carbon ring atoms, preferably a phenyl group. $R^1$ may also represent —$YR^5$ where Y represents O, S or —$NR^6$ in which $R^6$ is hydrogen or an alkyl group comprising up to 20 carbon atoms, preferably up to 5 carbon atoms, and $R^5$ represents an alkyl or other aliphatic group comprising up to 20 carbon atoms, preferably up to 10 carbon atoms and more preferably up to 5 carbon atoms, or an aryl group comprising up to 10 carbon ring atoms, preferably a phenyl group. Alternatively, $R^5$ and $R^6$ may together complete a heterocyclic ring, preferably comprising up to 7 ring atoms selected from C, N, O and S. Thus, $R^1$ may, for example, represent a piperidine or morpholine ring bonded to the P atom via the N atom. Preferred groups represented by $R^1$ include ethoxy and phenyl moieties.

As is well understood in this technical area, a large degree of substitution may be tolerated for groups represented by $R^1$ to $R^6$. As a means of simplifying the discussion and recitation of these groups, the terms "group" and "moiety" are used to differentiate between chemical species that allow for substitution or which may be substituted and those which do not or may not be so substituted. For example, the phrase "alkyl group" is intended to include not only pure hydrocarbon alkyl chains, such as methyl, ethyl, octyl, cyclohexyl, isooctyl, t-butyl and the like, but also alkyl chains bearing conventional non-halogen-containing substituents known in the art, such as hydroxyl, alkoxy, phenyl, cyano, nitro, amino etc. The phrase "alkyl moiety" on the other hand is limited to the inclusion of only pure hydrocarbon alkyl chains such as methyl, ethyl, propyl, cyclohexyl, isooctyl, t-butyl and the like.

Each $R^3$ independently represents a divalent aliphatic linking group comprising up to 20 carbon atoms, preferably up to 10 carbon atoms and more preferably up to 5 carbon atoms, or an aromatic linking group comprising up to 10 carbon ring atoms, preferably a phenyl group. Examples of groups presented by $R^3$ include $(CH_2)_p$ where p has integral values of from 1 to 20, preferably 2 to 10 and more preferably 3 to 6.

$R^2$ and $R^4$ independently represent a hydrogen atom, an alkyl group comprising up to 20 carbon atoms, preferably up to 10 carbon atoms and more preferably up to 5 carbon atoms, or an aryl group comprising up to 10 carbon ring atoms, preferably a phenyl group. When $R^3$ represents a divalent aliphatic linking group, $R^2$ and $R^4$ together may complete a heterocyclic ring including —N—$R^3$—N—, the remaining ring atoms being selected from C, N, O and S. Preferred examples of heterocyclic groups represented by —$N(R^2)R^3N(R^4)$— include piperazine-1,4-diyl and homopiperazine-1,4-diyl.

The P/N compounds generally comprise from 2 to 50, preferably from 2 to 25 and more preferably 2 to 15 repeating units. Two or more different repeat units described by formulae (I) and (II) may be present in the same molecule.

Examples of preferred P/N compounds possess repeat units selected from the following structures:

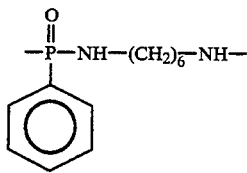

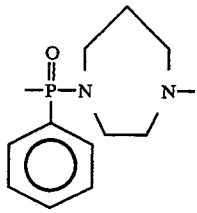

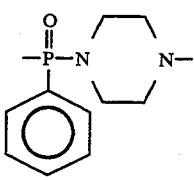

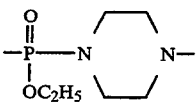

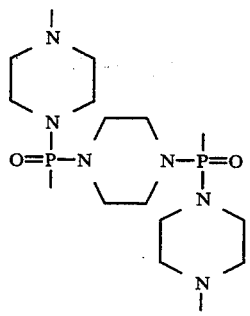

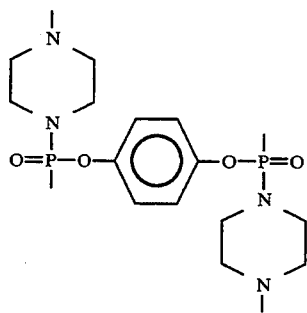

As stated previously, repeat units of different structures may be combined within the same molecule, and so linear, branched and cross-linked molecules are encompassed.

The flame-retardant additives of the invention are prepared by blending the P/N compounds with an additional source of phosphorus. The second source of phosphorus may comprise any inorganic or organic phosphorus source known in the art which (in the concentration used) does not deleteriously affect the properties of the polymer to which it is added. Preferred examples of the second phosphorus source comprise ammonium polyphosphate (commercially available under the trade name PHOSCHEK P-30 from Monsanto), melamine phosphate (commercially available under the trade name AMGARD NH from Albright and Wilson) and red phosphorus. The phosphorus source may optionally be encapsulated, e.g., in a water-insoluble resin. A preferred example is ammonium polyphosphate in melamine formaldehyde, commercially available under the trade name EXOLIT 462 from Hoechst-Celanese).

The weight ratio of the P/N compound to the additional phosphorus source is dependent on the flammability of the polymer composition to be flame-retarded and the level of flame-retardance to be achieved, but preferably is from 5:1 to 1:5 and more preferably from 2:3 to 1:4. The particle size of the P/N compound and the second phosphorus source is important for both flammability performance and for the physical properties of the flame-retarded material. Preferably, both additive components have an average particle size of less than 80 μm, more preferably less than 40 μm. Conventional methods to obtain these particle sizes include using sieves ball milling and jet milling. Alternatively, during the preparation of the P/N compound, precipitation of the final product can be optimized to minimize particle size.

The P/N compounds are routinely prepared by condensation reactions of phosphonyl and phosphoryl halides. In order to minimize the evolution of toxic and corrosive combustion products, the oligomers preferably contain less than 0.5% by weight residual halide, more preferably less than 0.1% by weight residual halide and most preferably 0% (zero) by weight residual halide.

Due to the high thermal stability of the flame-retardant additive of the present invention, it is possible to impart flame-retardant properties to a wide range of polyolefins and other polymer materials. Preferred polymer materials include low density poly(ethylene) (LDPE), poly(ethylene-ethyl acrylate) (EEA), poly(ethylene-acrylic acid) (EAA), poly(ethylene-vinyl acetate) (EVA), poly(propylene) (PP), ethylenepropylene-diene monomers (EPDM) and copolymers thereof. It is also possible to impart flame-retardant properties to hydroxyl-containing olefin copolymers.

The choice of polymer, i.e., flammability, melt index (ASTM) and copolymer content, will affect the quantity of flame-retardant added, as will the level of flame-retardance to be achieved. Generally, the total flame-retardant loading by weight is from 10 to 60%, preferably from 20 to 50% of the total composition.

The flame-retardant Additives of the invention are particularly suitable for use in EEA, EVA and EEA formulations.

The polymeric compositions of the invention comprising the P/N compound(s), the second phosphorus source and the polymer, may be cross-linked, for example, either chemically or by high energy radiation. Examples of chemical cross-linking agents include the use of free radical initiators, such as dicumyl peroxide, together with co-curing agents, e.g., triallyl isocyanurate, or silane cross-linking technology, e.g., using products commercially available under the trade names MONSIL and SIOPLAS from Maillerfer and Dow Corning respectively. Cross-linking by high energy radiation can also be used, for example, by irradiating with an electron beam. Radiation doses in the range 2 to 40 Mrads, preferably 10 to 20 Mrads are appropriate. To promote cross-linking during irradiation, radical promoters, such as triallyl isocyanurate, can be used.

Surface treatments may be used to increase the coupling between the flame-retardant additive and the polymer host matrix. Materials such as zircoaluminates and titanates can be used or, more commonly, silane coupling agents.

Other additives, for example, smoke suppressants, anti-oxidants, heat stabilizers, UV stabilizers etc., can be added. However, care must be exercised in the selection of these additives so that they do not interfere with the flame-retardant mechanism of the P/N compound(s). Basic oxides, such as magnesium oxide or zinc oxide, are found to be particularly detrimental in large concentrations. Similarly, additives which contain water of hydration, e.g., alumina trihydrate, can also be inhibiting in large concentrations.

Polymer materials incorporating the flame-retardant additives of the present invention (referred to hereinafter as the "polymer compositions of the invention") can be processed Using conventional methods, e.g., Banbury or two-roll mill, and extruded or moulded, either by compression or injection methods. The polymer compositions of the invention are particularly suitable for use in wire and cable insulation, dimensionally recoverable products, especially heat recoverable products, moulded parts, extruded tubings, pipes and tape and film type constructions, where high levels of flame-retardancy together with evolution of low quantities of smoke and toxic corrosive combustion products are required.

Dimensionally recoverable products are ones which by appropriate treatment can alter their dimensions. In the case of heat recoverable products, this treatment would be heat. Polymer compositions of the invention where the polymer is cross-linked EEA/EVA are particularly useful in the preparation of flexible, flame-retardant, heat recoverable tubing.

Polymer compositions of the invention in the form of translucent films are particularly useful in signing applications. The P/N compounds can be prepared by the reaction of substituted dichlorophosphine oxides with a range of linear, cyclic (alicyclic and aromatic) diamines. These compounds have good thermal stability enabling them to be easily processed with polyolefins and other polymer materials.

The P/N compounds can be prepared according to the following generalized reaction scheme: in which;

(i)

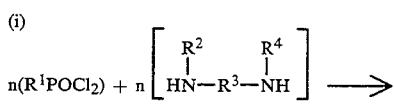

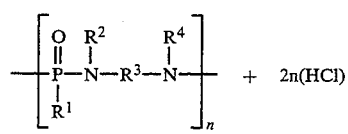

(ii)

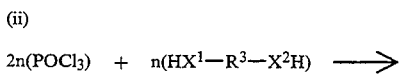

-continued

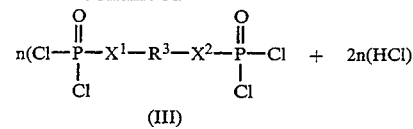

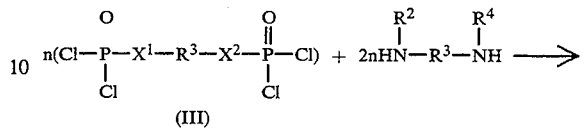

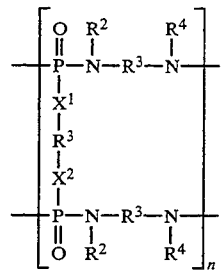

$X^1$, $X^2$ and $R^1$ to $R^4$ are as defined previously, and n has integral values of at least 2.

Reaction schemes (i) and (ii) show the synthesis of oligomers composed, respectively, of repeat units of formula (I) and formula (II). By isolating intermediate (III) of scheme (ii) and reacting it in suitable proportions with one or more diamines and $R^1POCl_2$, oligomers and polymers with varying degrees of branching and cross-linking may be produced.

The reactions are preferably carried out in an aprotic solvent such as chloroform, more preferably in the presence of a tertiary amine or other compound capable of binding the evolved hydrogen chloride.

The invention will now be described with reference to Examples 1 to 12 in which: Polyphosphonamides A to F have the following formulae Polyphosphonamide A

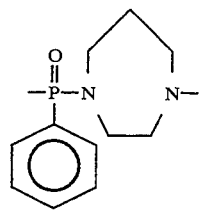

Polyphosphonamide B

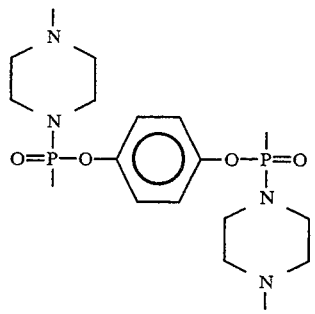

Polyphosphonamide C

-continued

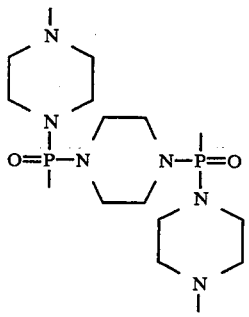

Polyphosphonamide D

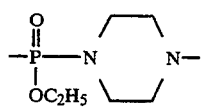

Polyphosphonamide E

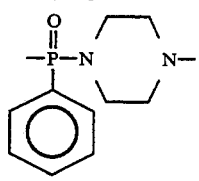

Polyphosphonamide F

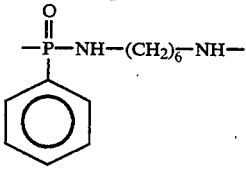

The preparation of phosphonamides A to C is described in Examples 1 to 3.

The flame-retardant additives were compounded, either using a steam heated Farrel Bridge two-roll mill at 140° C. for low density poly(ethylene) (LDPE) and 90 to 100° C. for poly(ethylene-ethyl acrylate) (EEA) and poly(ethylene-vinyl acetate) (EVA) or, mixed using a Brabender PLASTICORDER torque rheometer with a 30 cm internal mixing head for 2 minutes at 100° C. (EEA or EVA) and 140° C. (LDPE). Test pieces were produced by compression moulding using a Gem hydraulic press. Conditions employed were 110° C. for 10 minutes (EEA or EVA) and 150° C. for 20 minutes (LDPE) at 12193 kg (12 tons) pressure.

Polymer flammability performance in the Examples is determined using the Underwriter's Laboratory UL94 vertical bar flame test. This is a widely accepted test method and is commonly used by suppliers of flame-retardants and flame-retarded materials. In this test a vertically clamped specimen bar is ignited by a flame from a bunsen burner. According to Part 2 of UL94, three levels of performance are defined, designated V-0, V-1 and V-2, of which V-0 is the most stringent. In the test, samples not achieving V-0 and V-1 or V-2 are defined as fail. UL94 defines the specimen size as 12.7 cm (5 inches) long and 1.27 cm (½ inch) wide. The thickness of the sample must be no greater than 3.2 mm (⅛ inch). UL94 performance obviously depends on specimen thickness and is generally quoted for 1.6 mm (1/16 inch) or 3.2 mm (⅛ inch).

Smoke density comparisons were made using a Stanton Redcroft FTB smoke chamber attached to the Stanton Redcroft FTA Oxygen Index instrument on which Limiting Oxygen Index (LOI) measurements were made. The LOI test method is fully described in ASTM D 2863, but in general terms, the test defines the minimum concentration(%) of oxygen which will support candle-like combustion of the test materials. Hence a high value indicates good flame-retardance. Combustion gas corrosivity was determined by placing copper coated microscope slides in the above FTB chamber and allowing them to stand in the products of combustion for 16 hours.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

In Examples 1 to 3, the term "TGA-onset" refers to the temperature at which decomposition is first observed, using thermogravimetric analysis.

EXAMPLE 1

Preparation of Polyphosphonamide A

Dry triethylamine (30 ml) was added to a solution of homopiperazine (13.820 g; 0.138 mol) dissolved in dry chloroform (150 ml). Phenyl phosphonic dichloride (19.200 g; 0.099 mol) was then added to the solution over a period of 30 minutes. The reaction was performed under a dry argon atmosphere. The reaction mixture was allowed to warm to approximately 40° C. before being reduced to ambient temperature after which it was stirred for 24 hours. The amine hydrochloride formed was washed out with ice-cold water and the solution-dried over anhydrous magnesium sulphate. The product was then precipitated by adding the solution to diethyl ether. The off-white solid was filtered and dried under vacuum. Yield=5.000 g. IR (Nujol) $v_{(P=O)}$=1178 cm$^{-1}$. TGA-onset (air)=333° C.

EXAMPLE 2

Preparation of Polyphosphonamide B 1,4-bis(dichlorophosphate)benzene (127.600 g; 0.375 mol) in dry chloroform (490 ml) was added dropwise to a cooled solution (−40° C.) of piperazine (59.500 g; 0.692 mol) dissolved in dry chloroform (1450 ml) and dry triethylamine (327 ml) under continuous agitation. After the addition was complete, a clear pale yellow solution resulted which, upon reaching approximately −15° C. rapidly became a gel. Excess chloroform was decanted and the remaining solid stirred with distilled water (1500 ml). The resulting precipitate was then filtered, washed with distilled water (6×500 ml) and dried to recover a fine white powder. Yield=152.000 g.

Chemical analysis revealed that chlorine remained a minor constituent of the product. Consequently, the product was suspended in chloroform (1000 ml) in the presence of triethylamine (50 ml) and additional piperazine (40.000 g; 0.465 mol) in chloroform (250 ml) added. The mixture was heated to 50° C. for 3 hours and left to stand overnight. The resulting precipitate was filtered, washed with chloroform 1400 ml), crushed and dried on a large surface-area. The dried solid was powdered before stirring with distilled water (2×1500 ml) for 2 hours. The washed solid was filtered and dried under vacuum on a large surface area. The white powder-contained no chlorine by chemical analysis. Yield=149.400 g. IR (Nujol) $v_{(P=O)}=1213$ cm$^{-1}$. TGA-onset (air)=354° C.

EXAMPLE 3

Preparation of Polyphosphonamide C

Dry triethylamine (298 ml) was added to a solution of piperazine (50.005 g; 0.58 mol) dissolved in dry chloroform (893 ml). The resulting mixture was cooled to 5° C. before dropwise addition of phosphorus oxychloride (59.530 g; 0.387 mol) over 1 hour with stirring under an argon atmosphere. The solution was warmed to ambient temperature and then refluxed for 18 hours. The resulting gelatinous product was filtered, washed with excess chloroform and dried. The dried product was powdered and stirred in distilled water (600 ml) for 1 hour, filtered and washed with excess water and ethanol (5×20 ml) and dried under vacuum as a light tan powder. Yield=69.000 g.

Chemical analysis revealed that chlorine remained a minor constituent of the product. The dried product was suspended in chloroform (500 ml) and refluxed for 12 hours in the presence of piperazine (12.100 g; 0.141 mol) and excess triethylamine (50 ml). The product was filtered, washed with excess ethanol and dried. The dried product was ground and refluxed in ethanol (500 ml) for 4 hours and dried under vacuum. The final light tan product contained no chlorine by chemical analysis. Yield=63.400 g. IR(Nujol) $v_{(P=O)}=1186$ cm$^{-1}$. TGA-onset (air)=333° C.

EXAMPLE 4

Flammability Performance: Synergistic effect obtained by combining polyphosphonamide with phosphorus source This Example demonstrates the synergistic effect observed by combining a P/N compound with a secondary phosphorus source in chemically cross-linked ethylene-ethylacrylate copolymer (EEA; BP LE18-6EA; melt index 6 and EA content 18%). Samples were cross-linked using 2% dicumyl peroxide at 170° C. for 20 minutes at 12193 kg pressure. Three samples containing 40% loadings of APP (PHOSCHEK P-30, Monsanto) only, Polyphosphonamide E only and a mixture (1:2) of Polyphosphonamide E:APP were tested according to the UL94 procedure at 1.6 mm. The results obtained are shown in TABLE 1.

TABLE 1

| Sample* | Additive | Loading (%) | UL94 Test (1.6 mm) | LOI (%) |
|---|---|---|---|---|
| 1(c) | APP | 40 | Fail | 22 |
| 2(c) | Polyphosphonamide E | 40 | Fail | 25 |
| 3 | Polyphosphonamide E:APP (1:2) | 40 | V-0 | 34 |

*(c) = comparative sample not in accordance with the invention.

The combined formulation demonstrated a good flammability behaviour achieving the most stringent V-0 level of flame-retardance, whereas the P/N compound and the source of phosphorus when used individually both failed to achieve any UL94 rating. Limiting Oxygen Index (LOI) values were also significantly higher for the combined formulation.

EXAMPLE 5

Flammability Performance: Variation with change in ratio of Polyphosphonamide: phosphorus source Different ratios of Polyphosphonamide E:APP (PHOSCHEK P-30, Monsanto)—were examined in order to investigate the flammability performance at a 40% loading in chemically cross-linked EEA (BP-LE186EA; melt index 6 and EA content 18%). Samples were cross-linked using 2% dicumyl peroxide at 170° C. for 20 minutes at 12193 kg pressure. The results obtained are shown in TABLE 2 below.

TABLE 2

| Sample | Polyphosphonamide E:APP Ratio | Loading (%) | UL94 Test (1.6 mm) | LOI (%) |
|---|---|---|---|---|
| 4 | 3:2 | 40 | Fail | 32 |
| 5 | 1:1 | 40 | Fail | 33 |
| 6 | 2:3 | 40 | V-0 | 38 |
| 7 | 1:2 | 40 | V-0 | 34 |

Optimum performance for the combination of Polyphosphonamide E and APP in EEA was achieved at ratios greater than 1:1. At ratios of 1:1 or less, the mixture failed to achieve any UL94 rating, but still showed an increased LOI.

EXAMPLE 6

Flammability Performance: Variation with Loading

The effect of different loadings of a mixture (2:3) of Polyphosphonamide E.APP (PHOSCHEK P-30, Monsanto] on flammability performance was investigated in EEA (BP LE186EA; melt index 6 and EA.content 18%) chemically cross-linked using 2% dicumyl peroxide at 170° C. for 20 minutes at 12193 kg pressure. The results obtained are shown in TABLE 3 below.

TABLE 3

| Sample | Additive | Loading (%) | UL94 Test (1.6 mm) | LOI (%) |
|---|---|---|---|---|
| 8 | Polyphosphonamide E:APP (2:3) | 30 | Fail | 29 |
| 9 | Polyphosphonamide E:APP (2:3) | 40 | V-0 | 38 |
| 10 | Polyphosphonamide E:APP (2:3) | 50 | V-0 | 36 |

A 30% loading was inadequate to achieve any UL94 rating. Little difference was noted between 40 and 50% loading, although the LOI was surprisingly lower for the more highly loaded sample.

EXAMPLE 7

Flammability Performance: in Non-Cross-linked/Cross-linked Systems

TABLE 4 below shows the flammability performance of UL94 test-pieces to be the same for EEA (BP LE186EA; melt index 6 and EA content 18%) of simples loaded (50%) with a mixture of (2:3) of Polyphosphonamide E:APP [PHOSCHEK P-30, Monsanto] irrespective of cross-linking. Samples were chemically cross-linked using 2% dicumyl peroxide at 170° C. for 20 minutes at 12193 kg pressure. Radiation cross-linked samples were irradiated at an e-beam dose of 10 Mrad.

TABLE 4

| Sample | Additive | Loading (%) | Cross-Linking Method | UL94 Test (1.6 mm) |
|---|---|---|---|---|
| 11 | Polyphosphonamide E:APP (2:3) | 50 | None | V-0 |
| 12 | Polyphosphonamide E:APP (2:3) | 50 | Chemical | V-0 |
| 13 | Polyphosphonamide E:APP (2:3) | 50 | Radiation | V-0 |

EXAMPLE 8

Comparative Flammability Performance

The flammability performance of a mixture (2:3) Polyphosphonamide E:APP [PHOSCHEK P-30, Monsanto] was compared with a range of commercial halogenated and non-halogenated flame-retardants. The comparative systems were: EXOLIT IFR-10 (Hoechst US); SPINFLAM MF82/PP & SPINFLAM MF82/PE-A (Montefluos), and a halogenated mixture of decabromodiphenyl oxide [DBDPO] (Great Lakes Chemical Corporation DE-83)/antimony trioxide (Aldrich Chemical Co. 23089-8). The results obtained are shown in TABLE 5 below. All data refers to samples in chemically cross-linked EEA (BP LE1869A; melt index 6 and EA content 18%). Samples were chemically cross-linked using 2% dicumyl peroxide at 170° C. for 20 minutes at 12193 kg pressure.

TABLE 5

| Sample | Additive | Loading (%) | UL94 Test (1.6 mm) | LOI (%) | Smoke Density OD(g) |
|---|---|---|---|---|---|
| 14 | Polyphosphonamide E:APP (2:3) | 49 | V-0 | 38 | 0.19 |
| 15(c) | EXOLIT IFR-10 | 40 | V-0 | 35 | 0.09 |
| 16(c) | SPINFLAM MF82/PP | 40 | Fail | 35 | 0.11 |
| 17(c) | SPINFLAM MF82/PE-A | 40 | V-0 | 34 | 0.06 |
| 18(c) | DBDPO/Sb$_2$O$_3$ (22:8) | 30 | V-0 | 24 | 0.95 |

*(c) = comparative sample not in accordance with the invention.

The flame-retardant additive of the invention achieves the same flammability rating (UL94 V-0) as the best of the non-halogenated and halogenated flame retardants of the prior art. It also achieves the highest LOI value. All the non-halogenated materials easily out-perform DBDPO/Sb$_2$O$_3$ in terms of smoke density. The small differences in the smoke density generated by the various non-halogenated materials would not be significant in practical applications.

EXAMPLE 9

Copper Mirror Corrosion Test

Combustion gas corrosivity was determined by placing copper coated microscope slides in a Stanton Redcroft FTB smoke chamber and allowing them to stand in the products of combustion for 16 hours. The combustion source attached to the smoke chamber was a Stanton Redcroft FTA Oxygen Index instrument upon which Limiting Oxygen Index (LOI) measurements were routinely made. The combusted samples contained a mixture (2:3) of Polyphosphonamide E:APP [PHOSCHEK P-30] or a halogenated mixture of decabromodiphenyloxide (DBDPO) (Great Lakes chemical Corporation DE-83)/antimony trioxide (Aldrich Chemical Co. 23089-8) in non-cross-linked EEA (BP LE186EA; melt index 6 and EA content 18%). The copper surfaces were inspected before and after exposure. The results obtained are shown in TABLE 6.

TABLE 6

| Sample* | Additive | Loading (%) | Corrosion |
|---|---|---|---|
| 19 | Polyphosphonamide E:APP (2:3) | 40 | None |
| 20(c) | DBDPO/Sb$_2$O$_3$ (22:8) | 30 | Yes |

*(c) = comparative sample not in accordance with the invention

A control slide left in the laboratory air for 16 hours showed no visible signs of corrosion. No visible signs of corrosion were observed for the non-halogen sample.

EXAMPLE 10

Other Polymer Systems

This Example shows that a mixture (2:3) of Polyphosphonamide E:APP (PHOSCHEK P-30, Monsanto] also achieves excellent results in chemically cross-linked/-non-cross-linked low density polyethylene (BASF LUPOLEN 1-812D; melt index 0.2) and copoly(ethylene-vinylacetate) (Dupont ELVAX 470; Melt Index 0.7 and VA content 18%) as well as EEA. The cross-linked samples were chemically cross-linked using 2% dicumyl peroxide at 170° C. for 20 minutes at 12193 kg pressure. The results obtained are shown in TABLE 7.

TABLE 7

| Sample | Additive | Loading (%) | Polymer System | UL94 Test (1.6 mm) | LOI (%) |
|---|---|---|---|---|---|
| 21 | Polyphosphonamide E:APP (2:3) | 40 | EVA | V-0 | 34 |
| 22 | Polyphosphonamide E:APP (2:3) | 40 | Cross-linked EVA | V-0 | 31 |
| 23 | Polyphosphonamide E:APP (2:3) | 40 | LDPE | V-0 | 45 |
| 24 | Polyphosphonamide E:APP (2:3) | 40 | Cross-linked LDPE | V-0 | 40 |

EXAMPLE 11

Flammability Performance of Other Polyphosphonamide Systems

The table below shows the flammability performance of UL94 test-pieces for flame-retarded systems mixtures (2:3) of Polyphosphonamides A,B,C,D and F:APP [PHOSCHEK P-30, Monsanto] in chemically cross-linked EEA (BP LE186EA; melt index 6 and EA content 18%). The samples were chemically cross-linked using 2% dicumyl peroxide at 170° C. for 20 minutes at 12193 kg pressure. The results obtained are shown in TABLE 8.

TABLE 8

| Sample | Additive | Loading (%) | UL94 Test (1.6 mm) |
|---|---|---|---|
| 25 | Polyphosphonamide A:APP (2:3) | 40 | V-0* |
| 26 | Polyphosphonamide B:APP (2:3) | 40 | V-0 |
| 27 | Polyphosphon- | 40 | V-0 |

TABLE 8-continued

| Sample | Additive | Loading (%) | UL94 Test (1.6 mm) |
|---|---|---|---|
| | amide C:APP (2:3) | | |
| 28 | Polyphosphon-amide D:APP (2:3) | 40 | V-1 |
| 29 | Polyphosphon-amide E:APP (2:3) | 40 | V-0 |

*at 3.2 mm

The results show that the flame-retardant additives of the invention are suitable for use with and produce excellent results in a wide variety of polyolefin materials.

EXAMPLE 12

Light Transmission of Highly Loaded Flame Retarded Systems

TABLE 9 below shows a comparison of the light transmission of highly filled flame-retarded systems with an unfilled system. The filled systems include commercially available halogenated/non-halogenated flame retarded systems, as well as a mixture (2:3) of Polyphosphonamide B:APP [PHOSCHEK P-40, Monsanto) in accordance with the invention. The comparative systems were: EXOLIT IFR-10 (Hoechst US) and a halogenated mixture of decabromodiphenyloxide [DBDPO] (Great Lakes Chemical Corporation DE-83)/antimony trioxide (Aldrich Chemical Co. 23089-8). All data refers to samples in non-cross-linked EEA (BP LE186EA; melt index 6 and EA content 18%) at 3.2 mm. Light transmission (normalized to 100% for unloaded polymer) was determined using a Parry densitometer (white light source).

TABLE 9

| Sample* | Additive | Loading (%) | % Transmission |
|---|---|---|---|
| — | — | — | 100 |
| 30(c) | DBDPO/Sb$_2$O$_3$ (22:8) | 30 | 25 |
| 31(c) | EXOLIT IFR-10 | 40 | 8 |
| 32 | Polyphosphonamide B:APP (2:3) | 40 | 49 |

*(c) = comparative sample not in accordance with the invention

Clearly the flame-retardant additives of the invention offer considerable benefits over commercially available halogenated and non-halogenated systems with regard to light transmission.

"PHOSCHECK P-30" and "PHOSCHEK P-40" (Monsanto), "EXOLIT IFR-10" (Hoechst US), "EXOLIT 462" (Hoechst-Celanese), "ELVAX 470" (Dupont), "LUPOLEN 1812D" (BASF), "SPINFLAM MF82" (Montefluos), "MONSIL" (Maillefer), "SIOPLAS" (Dow Corning), "AMGARD NH" (Albright & Wilson), "CHARGARD 329" (Great Lakes Chemical Corporation) and "PLASTICORDER" (Brabender) are all trade names/designations.

Various modification and alternations of this invention will become apparent to those skilled in the art without departing from the scope and spirit of this invention, and it should be understood that this invention is not to be unduly limited to the illustrative embodiments set forth herein above.

I claim:

1. A flame-retardant additive comprising a source of phosphorus wherein the source of phosphorus is ammonium polyphosphate, melamine phosphate or red phosphorus and a polymer or oligomer having repeating units selected from those represented by general formulae (I) and (II)

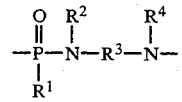

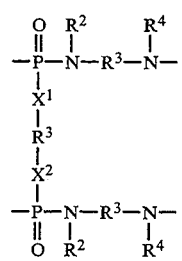

in which:

$R^1$ represents an alkyl group comprising up to 20 carbon atoms, an aryl group comprising up to 10 carbon ring atoms or a group represented by —YR$^5$ where R$^5$ is an alkyl or other aliphatic group comprising up to 20 carbon atoms or an aryl group comprising up to 10 carbon ring atoms and Y is O, S or —NR$^6$ where R$^6$ is a hydrogen atom, an alkyl group comprising up to 20 carbon atoms, an aryl group comprising up to 10 carbon ring atoms or R$^5$ and R$^6$ may together form a heterocyclic ring (including the N atom) wherein the other ring atoms are chosen from C, N, O and S;

each R$^3$ independently represents a divalent aliphatic linking group comprising up to 20 carbon atoms or a divalent aromatic linking group comprising up to 10 carbon ring atoms;

R$^2$ and R$^4$ independently represent a hydrogen atom, an alkyl group comprising up to 20 carbon atoms or an aromatic group comprising up to 10 carbon ring atoms or, when R$^3$ is aliphatic, R$^2$ and R$^4$ may complete a heterocyclic ring including —N—R$^3$—N—, the remaining ring atoms being selected from C, N, O and S, and $X^1$ represents O, S or NR$^2$, where R$^2$ is as defined previously, and $X^2$ represents O, S or NR$^4$, where R$^2$ and R$^4$ are as defined previously.

2. A flame-retardant additive as claimed in claim 1 in which R$^1$ represents an alkyl group comprising up to 10 carbon atoms or a phenyl group.

3. A flame-retardant additive as claimed in claim 2 in which R$^1$ represents an alkyl group comprising up to 5 carbon atoms.

4. A flame-retardant additive as claimed in claim 1 in which R$^1$ represents —YR$^5$ where R$^5$ represents an alkyl or other aliphatic group comprising up to 10 carbon atoms or a phenyl group.

5. A flame-retardant additive as claimed in claim 4 in which R$^5$ represents an alkyl group comprising up to 5 carbon atoms.

6. A flame-retardant additive as claimed in claim 1 in which R2 and/or R4 represents an alkyl group comprising up to 10 carbon atoms, or a phenyl group.

7. A flame-retardant additive as claimed in claim 6 in which R$^2$ and/or R$^4$ represents an alkyl group comprising up to 5 carbon atoms.

8. A flame-retardant additive as claimed in claim 1 in which R3 represents an aliphatic group and R2 and R4 together complete a divalent aliphatic group linking the N atoms.

9. A flame-retardant additive as claimed in claim 1 in which the compound of formula (I) has a structure represented by:

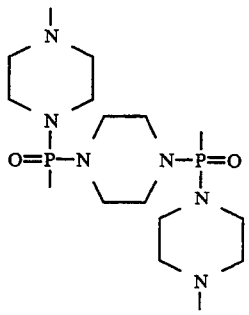

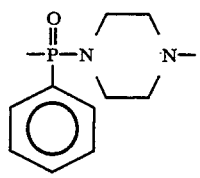

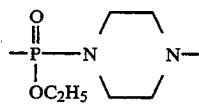

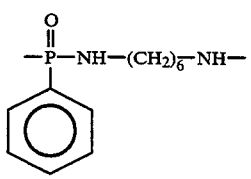

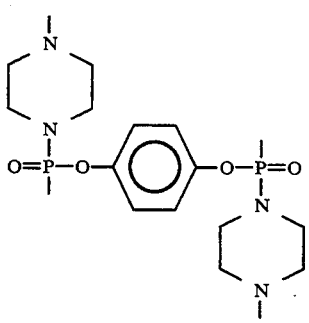

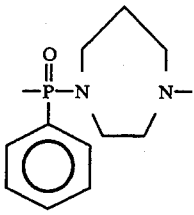

10. A flame-retardant additive as claimed in claim 1 in which the source of phosphorus is encapsulated in a water-insoluble resin.

11. A flame-retardant additive as claimed in claim 10 in which the water-insoluble resin is melamine formaldehyde.

12. A flame-retardant additive as claimed in claim 1 in which the weight ratio of the polymer or oligomer to the source of phosphorus is from 5:1 to 1:5.

13. A flame-retardant additive as claimed in claim 12 in which the weight ratio of the polymer or oligomer to the source of phosphorus is from 2:3 to 1:4.

14. A flame-retardant additive as claimed in claim 1 in which the polymer or oligomer and/or the source of phosphorus are prepared as particles having an average particle size of less than 80 mm.

15. A flame-retardant additive as claimed in claim 14 in which the polymer or oligomer and/or the source of phosphorus are prepared as particles having an average particle size of less than 40 $\mu$m.

16. A polymer composition having a flame-retardant loading of a flame-retardant additive as claimed in claim 1.

17. A polymer composition as claimed in claim 16 in which the flame-retardant additive is present in an amount of from 10 to 60% by weight of the polymer composition.

18. A polymer composition as claimed in claim 17 in which the flame-retardant additive is present in an amount of from 20 to 50% by weight of the polymer composition.

19. A polymer composition as claimed in claim 16 in which the polymer comprises a homopolymer or copolymer of an olefin.

20. A polymer composition as claimed in claim 19 in which the polymer comprises a copolymer of a hydroxyl-containing olefin.

21. A polymer composition as claimed in claim 19 or claim 20 in which the polymer comprises low density poly(ethylene), high density poly(ethylene), linear low density poly(ethylene), poly(ethylene-acrylic acid) poly(ethylene-ethyl acrylate), poly(ethylene-vinyl acetate), poly(propylene) or ethylene-propylene-diene monomers.

22. A polymer composition as claimed in claim 16 in which the polymer is cross-linked with the flame-retardant additive.

23. A polymer composition as claimed in claim 22 in which the composition is cross-linked chemically or by high energy radiation.

24. A polymer composition as claimed in claim 22 or claim 23 in which the composition is surface treated to increase the linkage between the polymer and the flame-retardant additive.

25. A polymer composition as claimed in claim 18 additionally including one or more additives selected from smoke suppressants, antioxidants, heat stabilizers and U.V. stabilizers.

26. An article formed from a polymer composition as claimed in claim 16.

27. An article as claimed in claim 26 in the form of a tube, pipe, tape or other moulded article.

* * * * *